(12) United States Patent
Schneider et al.

(10) Patent No.: US 10,613,580 B1
(45) Date of Patent: Apr. 7, 2020

(54) ENTERTAINMENT DEVICE AND METHOD OF HAVING COORDINATED VIDEO AND AUDIO FROM SELECTED ARTISTS

(71) Applicants: Chase Schneider, Orlando, FL (US); Cole Schneider, Orlando, FL (US)

(72) Inventors: Chase Schneider, Orlando, FL (US); Cole Schneider, Orlando, FL (US)

( * ) Notice: Subject to any disclaimer, the term of this patent is extended or adjusted under 35 U.S.C. 154(b) by 0 days.

(21) Appl. No.: 16/055,042

(22) Filed: Aug. 4, 2018

Related U.S. Application Data

(60) Provisional application No. 62/605,498, filed on Aug. 16, 2017.

(51) Int. Cl.
| | |
|---|---|
| *H05K 7/00* | (2006.01) |
| *G06F 1/16* | (2006.01) |
| *G06F 3/147* | (2006.01) |

(52) U.S. Cl.
CPC .......... *G06F 1/1605* (2013.01); *G06F 1/1635* (2013.01); *G06F 1/1637* (2013.01); *G06F 3/147* (2013.01)

(58) Field of Classification Search
CPC ....................................................... H05K 5/00
See application file for complete search history.

(56) References Cited

U.S. PATENT DOCUMENTS

| | | |
|---|---|---|
| 8,934,226 B2 | 1/2015 | Smith |
| 9,578,384 B2 | 2/2017 | Selim et al. |
| 2010/0246119 A1* | 9/2010 | Collopy ................ G06F 1/1616 361/679.55 |
| 2014/0282071 A1 | 9/2014 | Trachtenberg et al. |
| 2015/0070340 A1 | 3/2015 | Trachtenberg et al. |

OTHER PUBLICATIONS

Digital Photo Frame, www.amazon.com/digital-electronics-picture, 8 pages, amazon web site, 2017/.

* cited by examiner

*Primary Examiner* — Jerry Wu
(74) *Attorney, Agent, or Firm* — Stan Collier, Esq.

(57) ABSTRACT

The present invention provides a method of presenting entertainment by obtaining from a selected artist video and audio data regarding the artist's work and placing the data on a portable storage device for use in an entertainment frame. After uploading the data into the entertainment frame's controller, the user selects one or more presentations by the artist to be played on the entertainment frame. The entertainment device comprises a picture frame being mounted on a vertical surface with a display screen in the picture frame. The frame has a rechargeable battery for operating a controller that accepts an input device with a selected artist's video and audio data. The audio and video are played on the screen to provide entertainment from a selected singer or painter. Further, the entertainment device may be modular and removable from the picture frame so as to be transported easily to other locations.

3 Claims, 5 Drawing Sheets

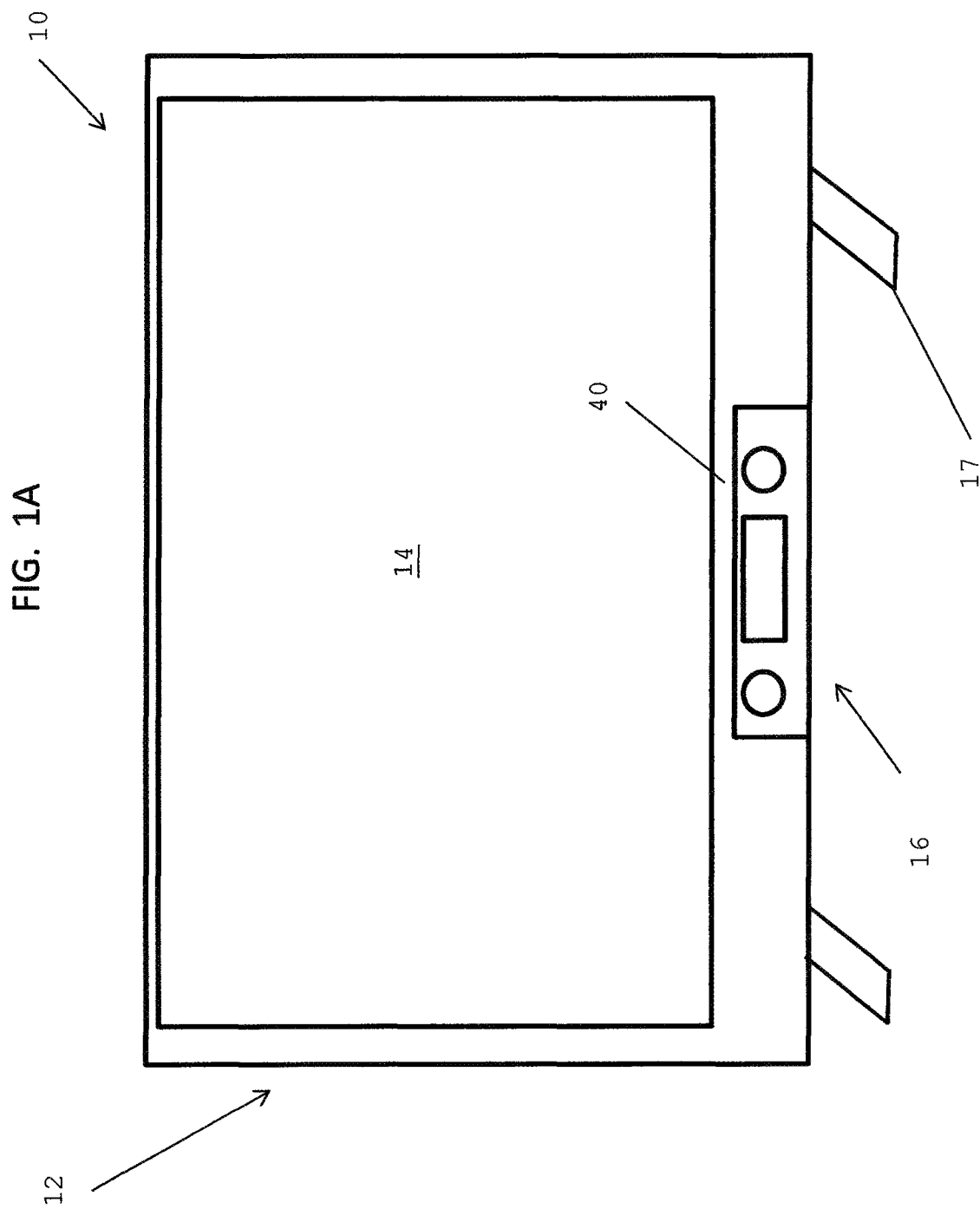

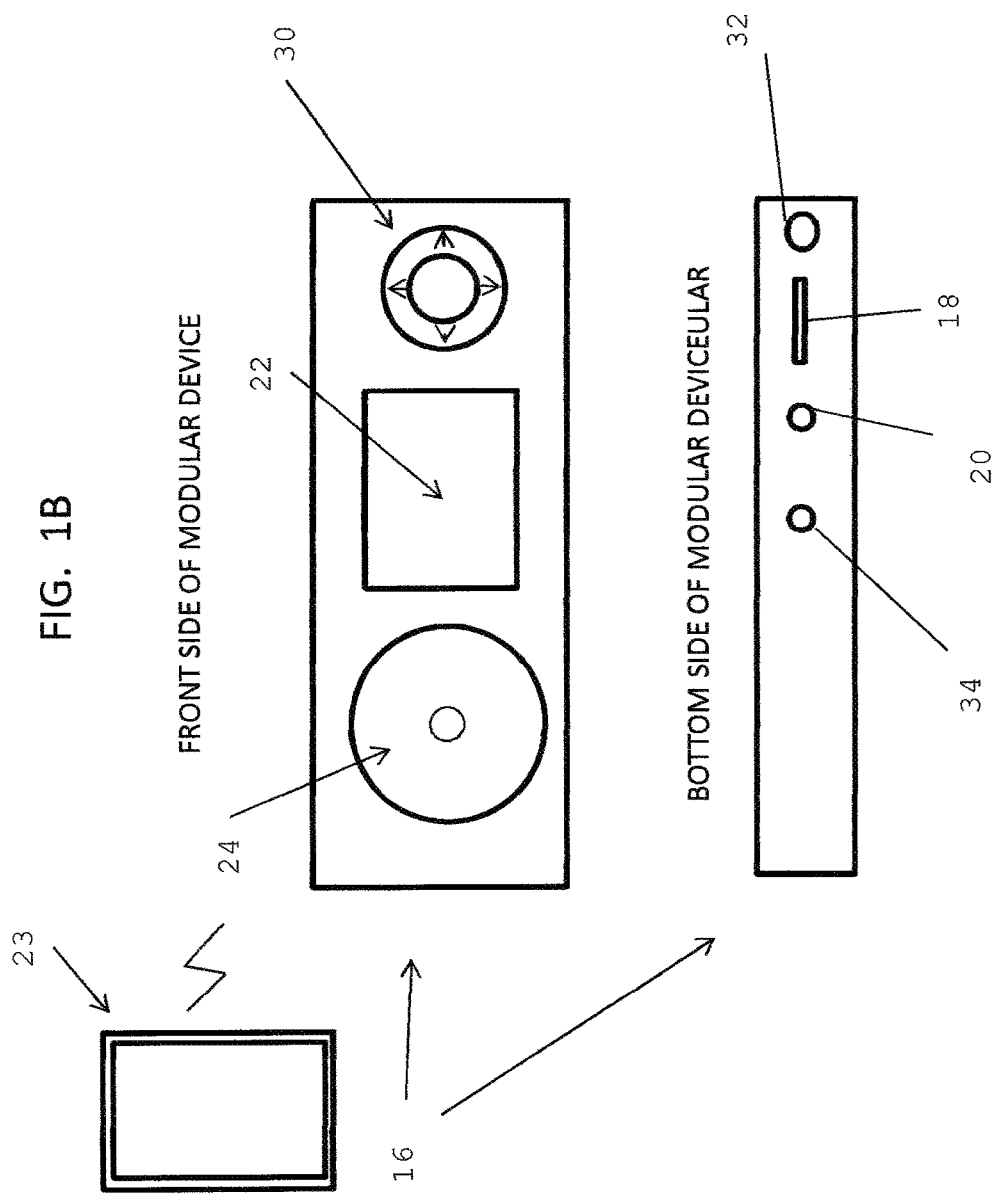

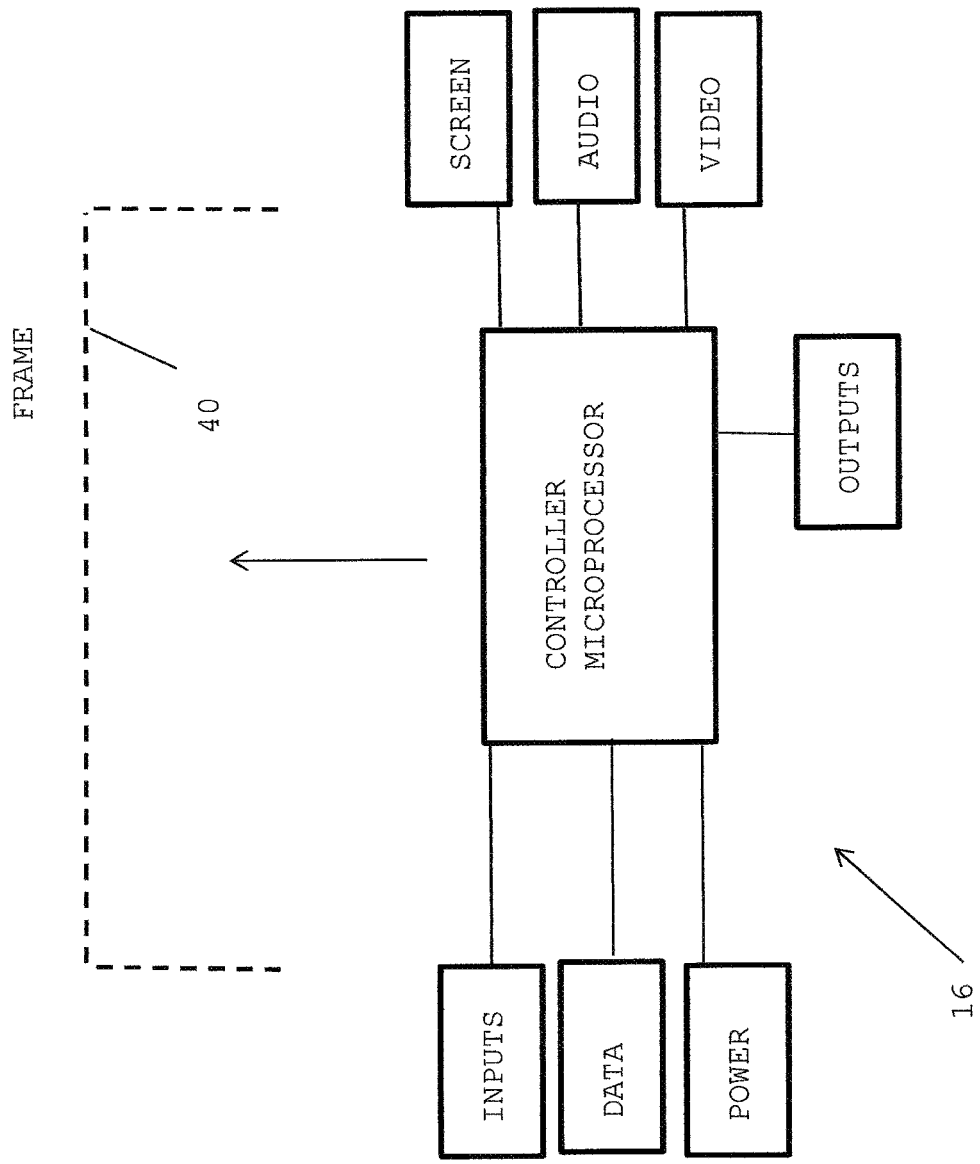

ENTERTAINMENT DEVICE AND METHOD OF HAVING COORDINATED VIDEO AND AUDIO FROM SELECTED ARTISTS

CROSS REFERENCES TO RELATED APPLICATIONS

This regular utility patent application claims priority to provisional patent application 62/605,498 filed Aug. 16, 2017 having the title, "Entertainment Device and Method of Having Coordinated Video and Audio" by Chase and Cole Schneider;

Reference to Federally sponsored research or development: NA

Reference to joint research agreements: NA

Reference to Sequence Listing: NA

BACKGROUND OF THE INVENTION

Field of the Invention

The present invention relates generally to entertainment devices, and, in particular, to devices providing video and/or audio, and, in great particularity, to devices providing artist created video and audio products.

Description of the Prior Art

With the availability of numerous digital products, people may obtain customized entertainment.

Several prior art devices can provide both audio and video. U.S. Pat. No. 8,934,226, titled "Mountable Device Having a Pivotable Input Device Support", issued Jun. 13, 2015, by Smith discloses a wall mountable computer system as noted in Col. 11, lines 9 to 42, having both video and audio support through numerous devices including being connected to the Internet. U.S. Pat. No. 9,578,384, entitled "Systems and Method for Providing Video on Demand in an Intelligent Television", issued Feb. 21, 2017, by Flextronics discloses a table mounted television having user interface for video-on-demand (VOD) and the use of such. U.S. Patent Application Publication 2014/0282071, titled Systems and Methods for Distributing, Viewing, and Controlling Digital Art and Imaging, published Sep. 18, 2014, by Trachtenberg discloses a frame with a screen as would be provided by a tablet as discussed in paragraphs [0127] to [0129] where an additional controller is attached to the frame. U.S. Patent Application Publication 2015/0070340, entitled "Display Device for Displaying Digital Imaging", published Mar. 12, 2015, by Trachtenberg discloses a vertically mounted display screen with supporting computer system connected via the Internet to the Cloud. Further, a photo frame electronic video/audio player by Amazon supports pictures, videos, and audio. All prior art as noted above is incorporated by reference as to its teachings.

Accordingly, there is a need for a device and method of providing entertainment by selected artists.

SUMMARY OF THE INVENTION

The present invention provides device and a method of presenting unique entertainment by obtaining from a selected artist video or imagery and audio regarding the artist's work and playing the data of such on an entertainment device. In this regard, the video means single pictures or multiple pictures or movies or any other visual representation as desired by the artist. The entertainment device has a picture-like frame with a screen therein with a controller therein from which the user selects one or more presentations by the artist to be played on the entertainment device. The entertainment device comprises a picture frame being mounted on a vertical surface with a display screen in the picture frame. The frame has a rechargeable battery for operating the controller that accepts an input device with a selected artist's video and audio data. The device does not require a direct connection to a power source such as a wall outlet. The device may have a modular device that can play one or both video and audio when removed from the frame. The audio and video are played on the screen in the frame or in the modular device to provide entertainment from a singer or Painter.

It is an object of the present invention to provide an entertainment device for playing coordinated video and audio from a selected artist.

It is another object of the present invention to provide an entertainment device that can be mounted on almost any vertical surface.

It is a further object of the present invention to provide an entertainment device that is stand-alone and operates with a rechargeable battery.

It is still a further object of the present invention to provide an entertainment device that can play artist created video and audio such as pictures with a song.

It is still another object of the present invention to provide an entertainment device where the artist may obtain additional profit.

It is still another object of the present invention to provide an entertainment device that is modular and may be removed from the picture frame to be transportable.

These and other objects, features, and advantages of the present invention will become more readily apparent from the attached drawings and the detailed description of the preferred embodiments, which follow.

BRIEF DESCRIPTION OF THE DRAWINGS

FIG. 1A is a front view of an entertainment device of the present invention;

FIG. 1B is a front and bottom view of the modular device for the entertainment device of FIG. 1A;

FIG. 4 is a block schematic of an electronic system of the present invention.

Like reference numerals refer to like parts throughout the several views of the drawings.

DETAILED DESCRIPTION OF THE PREFERRED EMBODIMENTS

The present invention provides a device and a method of presenting unique entertainment by obtaining from a selected artist video and audio regarding the artist's work and playing the data of such on an entertainment device. The entertainment device has a picture-like frame with a screen therein with a controller therein from which the user selects one or more presentations by the artist to be played on the entertainment device. The entertainment device comprises a picture frame being mounted on a vertical surface or on a stand with a display screen in the picture frame. The frame has a rechargeable battery for operating the controller that accepts an input device such as a stick memory with a selected artist's video and audio data. The device may have a modular device that can play one or both video and audio when removed from the frame. The audio and video are played on the screen in the frame or in the modular device to provide entertainment from a selected singer or painter.

The present invention brings the vision of the artist in making the song in art with the song itself using an artist rendering that capture's the musician's inspiration in art for the song and put in on canvas or print with the song playing. The present invention provides an artist the ability to further earn revenue by providing a personal story of his/her inspiration history of the song and how the art identifies with his/her personal feelings, emotions and/or thoughts of the songs personal meaning to the musician.

Figure 2:
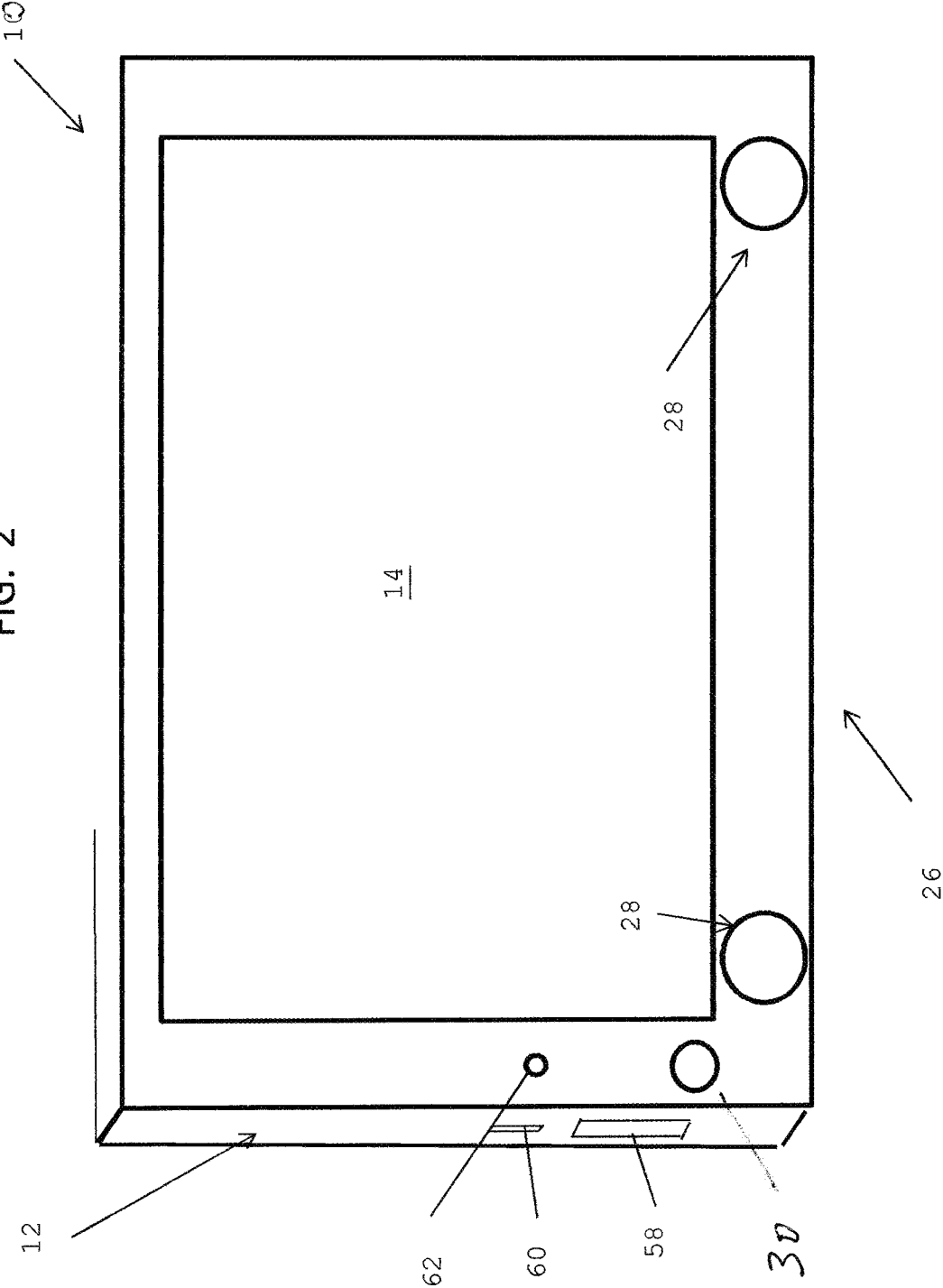
FIG. 2 is a partial perspective view of another entertainment device of the present invention.
Figure 3:
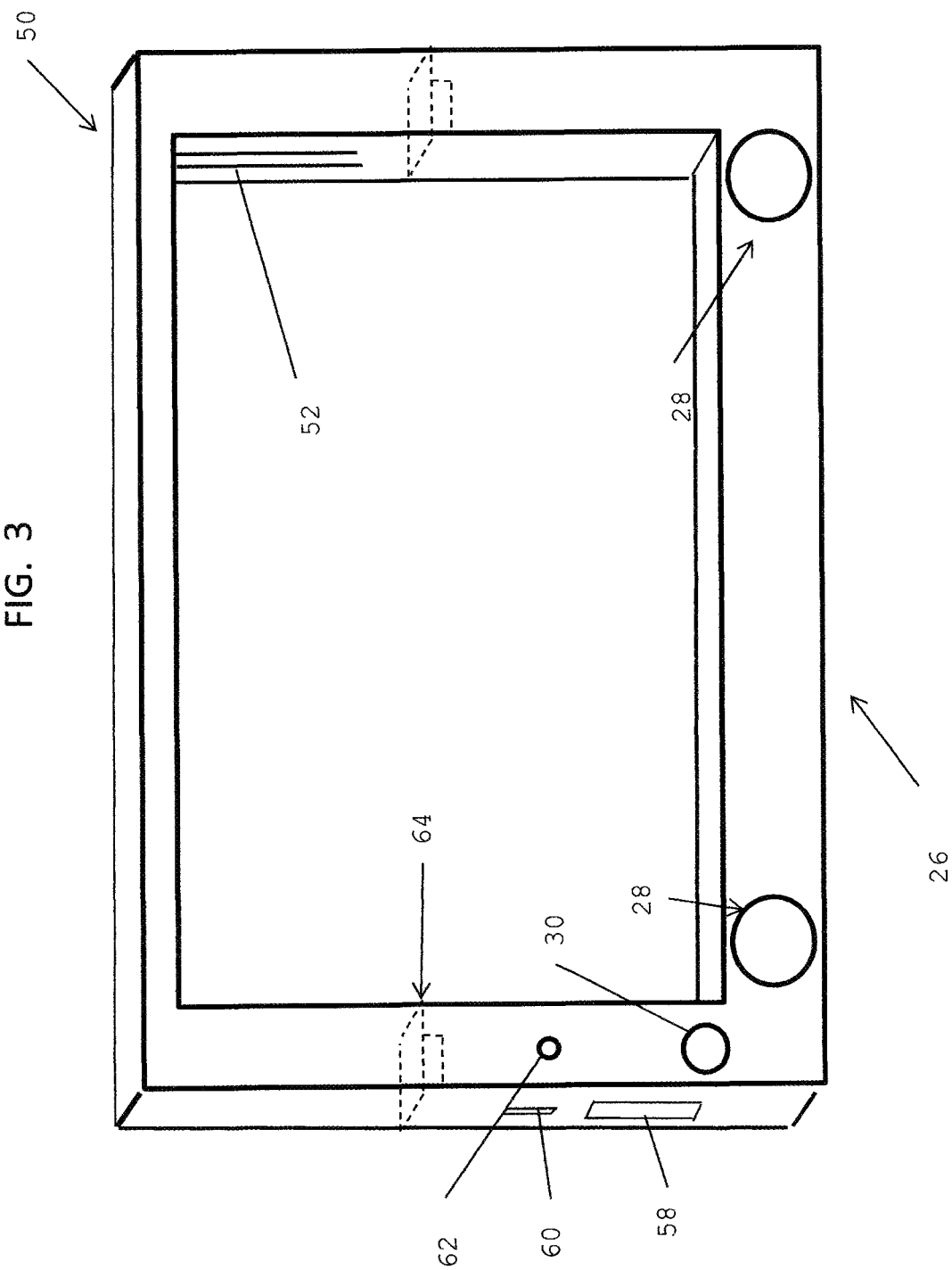
FIG. 3 another perspective view of another embodiment of the entertainment device having a separable frame to allow the insertion of a picture into the frame and the associated electronics to play music.

FIGS. 1A and 1B disclose an embodiment of the entertainment device 10 with a picture frame 12 that is mountable to vertical surface such as a wall. Further the picture frame 12 may be mounted on a stand 17 to be placed on a flat surface such as a table. A display screen 14 is mounted in the picture frame 12 or the picture frame may hold an actual picture. A means for presenting at least one video object such as a single picture or multiple pictures or movies in the picture frame 12 being mounted within the picture frame 12 such as a modular device 16 that may also act as a stand-alone device for the display of imagery and associated audio that uses an input device such as a stick memory having video and audio data provided by a selected artist. The stick memory is input into a USB port 18. A source of rechargeable power is integrated into the modular device 16 and can be recharged via a charge port 20 for the means for presenting. A controller, such as in FIG. 4, controls the display 22 in the modular device 16 or display 14 if attached to the frame 12. The modular device 16 may be integrated into the frame 12 as shown in FIGS. 2 and 3. A speaker 24 is included on the modular device 16 or can be also in the picture frame 26, FIGS. 2 and 3, as stereo speakers 28. A navigating button 30 is included on either embodiment. FIG. 1A further illustrates the modular device port 40 being a snap-in port 40, with the other features on the modular device 16. Most of these same features are included in the integrated frame 26 as shown in FIGS. 2 and 3.

FIG. 3 illustrates an entertainment device having a separable frame 50 with frame connectors 64 so that a single picture may be inserted into the guide tracks 52. A pair of speakers 28 are on the frame 50. A control button 30 allows for navigation. A battery compartment 58 is on the side of the frame 50 as well as a USB port 60 and a battery indicator light 62.

The method of the present invention allows the user to select the artists, whether painter or singer that provides both digital information having both pictures and audios that can be played on the entertainment device. FIG. 4 details conventional features of a computer system that operates the entertainment device 10.

In support of the entertainment device 10, the method comprises the steps of obtaining from a selected artist video and audio data regarding the artist's work and placing the data on a portable storage device such as a memory stick for use in the entertainment system of the Present invention. Although this is a preferred method, the data may also be downloaded onto a computer from a website supporting the present invention, or from a smart device 23, FIG. 1B, using an app and then wirelessly transferring the data to the entertainment system or be placed on a memory stick and then inserted into the input port 18. That data is then uploaded into the entertainment device 10 for play.

Since many modifications, variations, and changes in detail can be made to the described embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. An entertainment device for providing coordinated video and audio of selected artists, said entertainment device comprising: a picture frame, said picture frame being able to be mounted on a vertical or a horizontal surface, a separable frame with frame connectors for inserting a removable single picture, further including a modular device removably attached to said picture frame, said modular device being able to present audio and video from said selected artist; a means for displaying imagery in said picture frame such means for displaying being at least one picture, or two or more pictures or movies as a video and being mounted within said picture frame, wherein said means for displaying is a display screen, said means for displaying comprising: an input device, said input device having video and audio data provided by a selected artist that is selected by a user, further including information from said selected artist that is coordinated by said artist as related to both the video and audio, wherein said information from one or more selected artists is obtained from a website, from an app in a smart device, and from a memory stick; a source of rechargeable power for said means for displaying; an output device for displaying data from said video and audio data; and a controller having therein a microprocessor for controlling said input and output device.

2. The entertainment device as defined in claim 1, wherein said selected artist is either a singer or painter.

3. The entertainment device as defined in claim 1, wherein said modular device comprises a navigation button for viewing available data, a power button, a USB port for a stick memory or the like, a charging port, an indicator light for displaying the status of the modular device, a display for displaying the data, and a speaker, wherein said modular device is a stand-alone entertainment device.

* * * * *